United States Patent
Tamura

(10) Patent No.: US 8,786,963 B2
(45) Date of Patent: Jul. 22, 2014

(54) IMAGING LENS AND IMAGING APPARATUS

(71) Applicant: Sony Corporation, Tokyo (JP)

(72) Inventor: Masaki Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/671,997

(22) Filed: Nov. 8, 2012

(65) Prior Publication Data

US 2013/0162883 A1    Jun. 27, 2013

(30) Foreign Application Priority Data

Nov. 18, 2011    (JP) .................................. 2011-252706

(51) Int. Cl.
G02B 1/00    (2006.01)
G02B 13/00    (2006.01)

(52) U.S. Cl.
CPC .......... *G02B 13/0045* (2013.01); *G02B 13/001* (2013.01)
USPC ............................. 359/714; 359/763; 359/764

(58) Field of Classification Search
CPC .. G02B 13/001; G02B 13/0045; G02B 13/18; G02B 9/60; H04N 5/225

USPC ........................... 348/340; 359/714, 763, 764
See application file for complete search history.

(56) References Cited

U.S. PATENT DOCUMENTS

2013/0033637 A1 *    2/2013 Sano .............................. 348/340

FOREIGN PATENT DOCUMENTS

| JP | 2009-265245 | 11/2009 |
| JP | 2010-049113 | 3/2010 |

* cited by examiner

*Primary Examiner* — David N Spector
(74) *Attorney, Agent, or Firm* — Rader, Fishman & Grauer PLLC

(57) ABSTRACT

An imaging lens including: in order from an object side thereof, a first lens having a positive refractive power; a second lens formed in a meniscus shape having a negative refractive power with a concave surface faced to an image side; a third lens formed in a biconvex shape having a positive refractive power near an optical axis; a fourth lens formed in a meniscus shape having a positive refractive power with a concave surface faced to the object side near the optical axis; and a fifth lens having a negative refractive power near the optical axis and a positive refractive power in a peripheral portion, the imaging lens satisfying the following conditional expression (a), $3.0 \leq f3/f4 \leq 30.0$ (a) where f3 is a focal length of the third lens, and f4 is a focal length of the fourth lens.

10 Claims, 11 Drawing Sheets

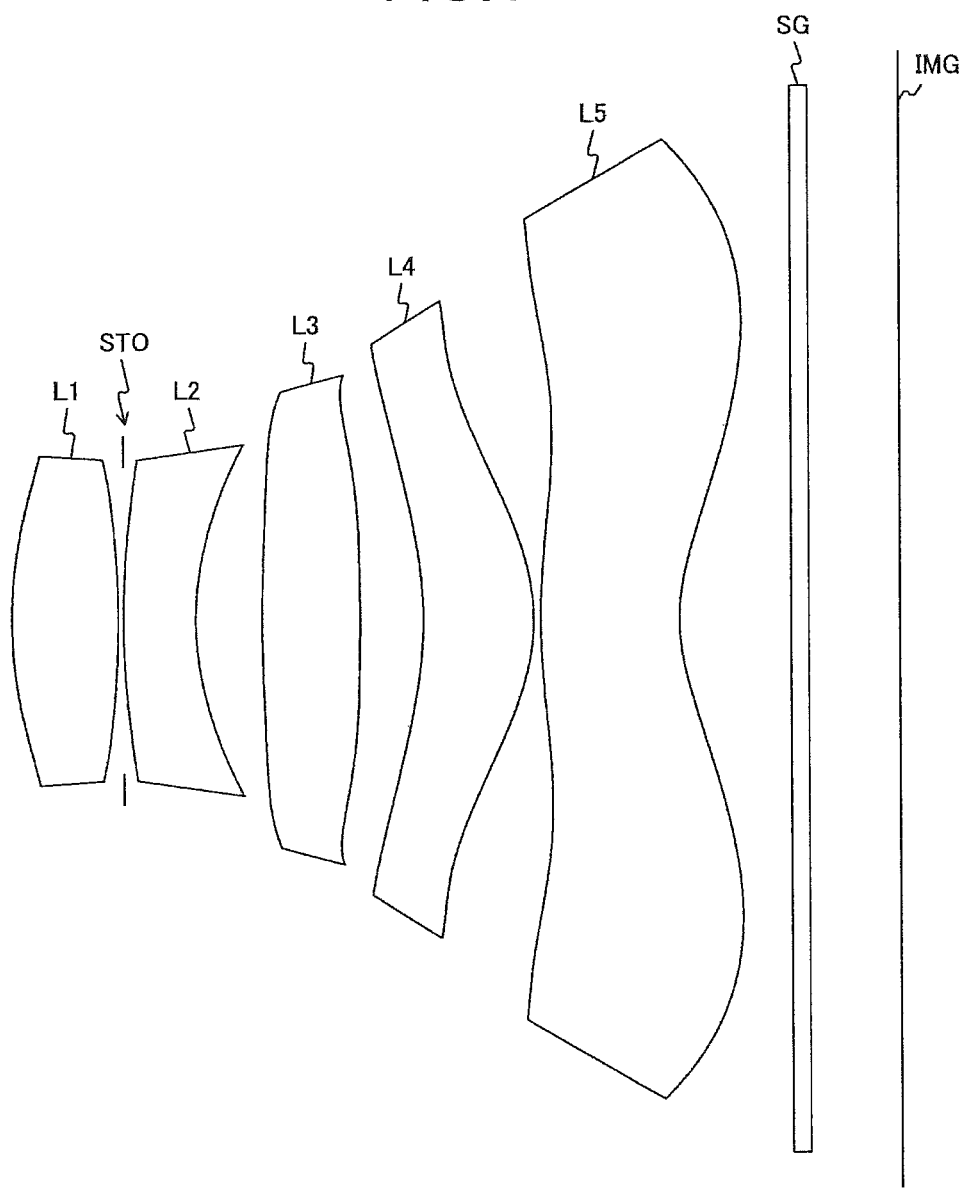

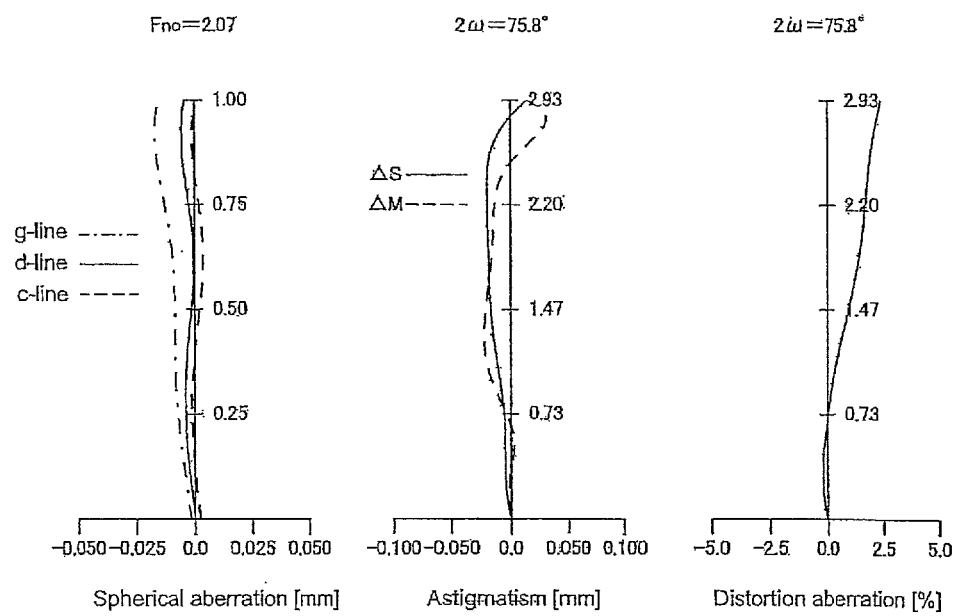

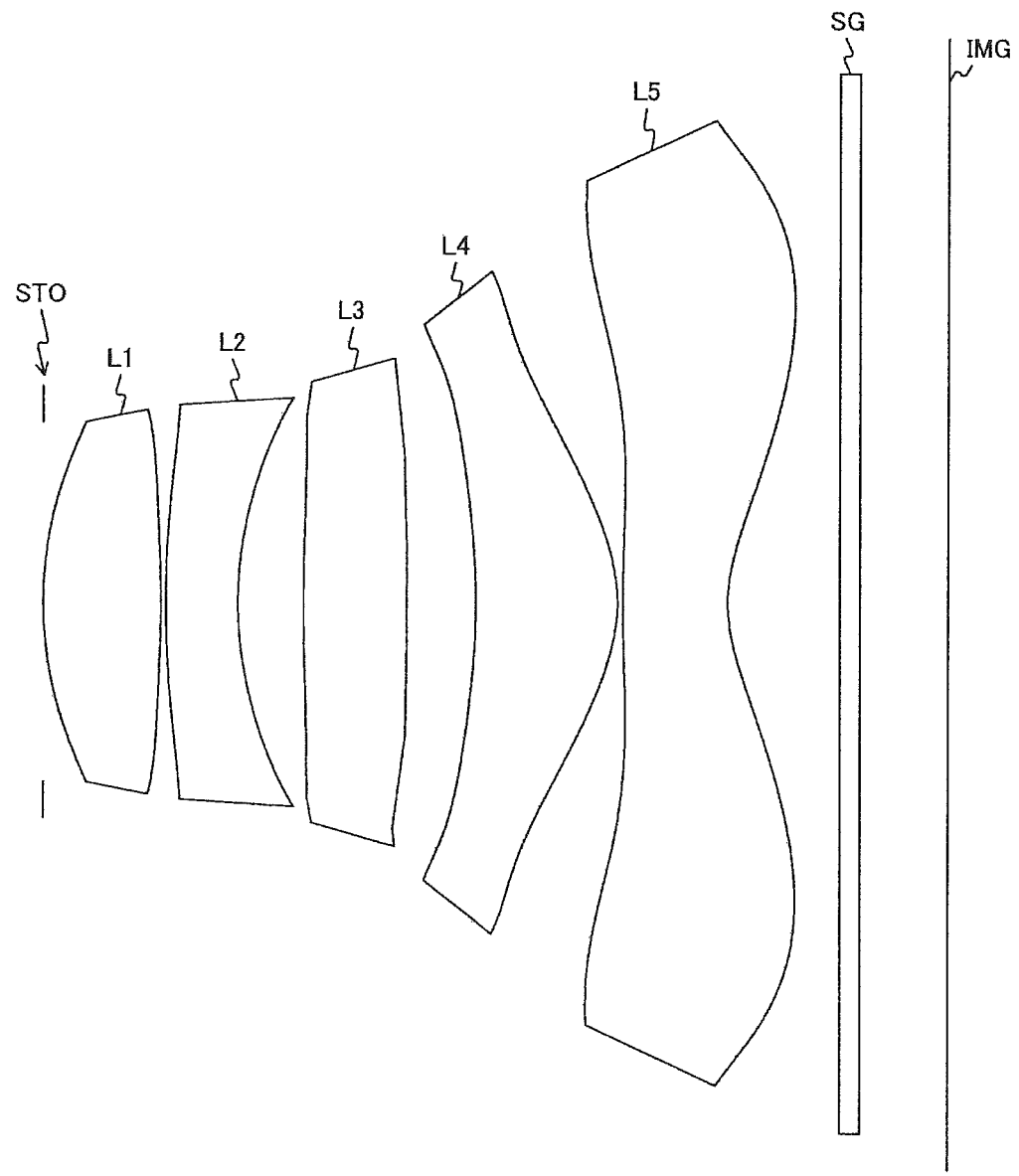

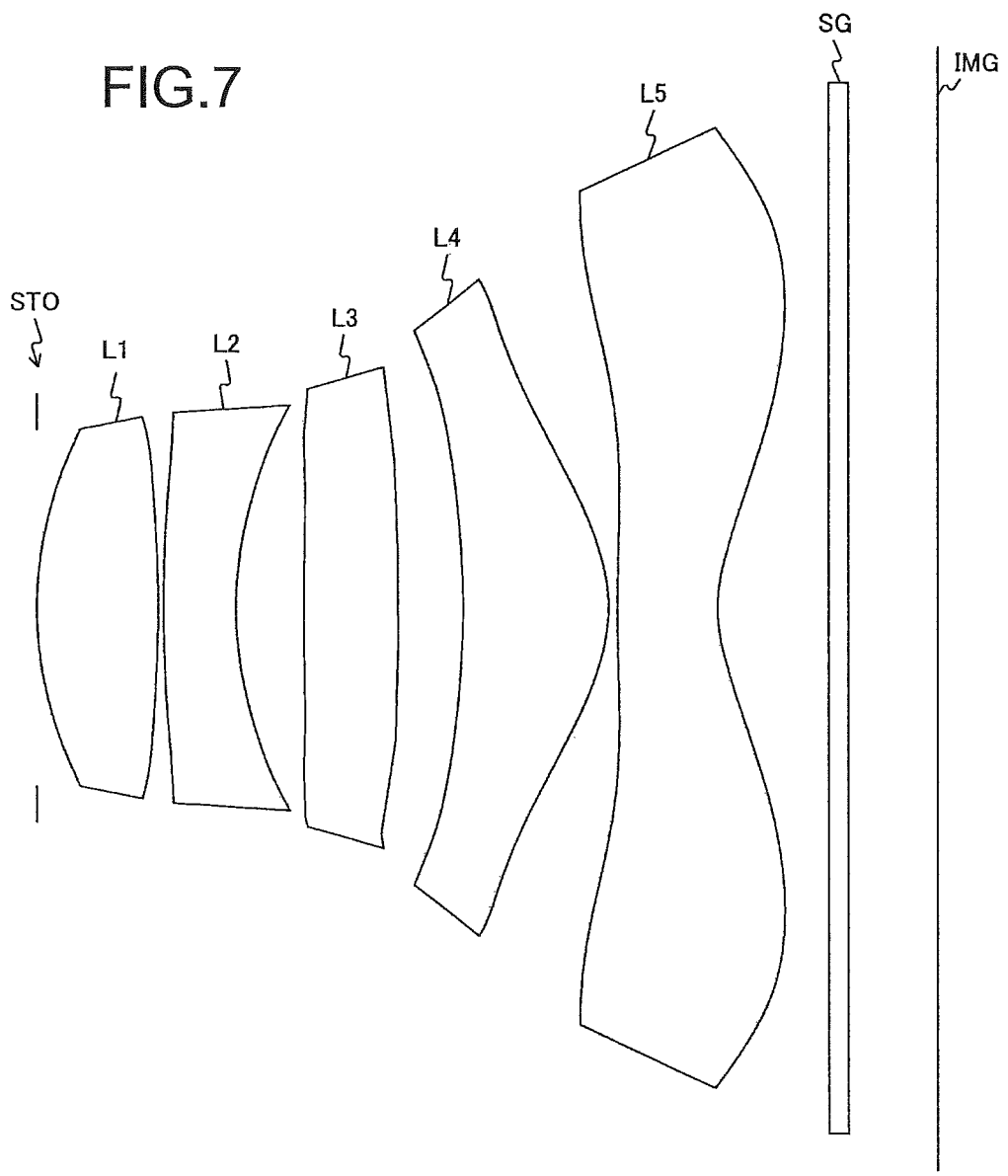

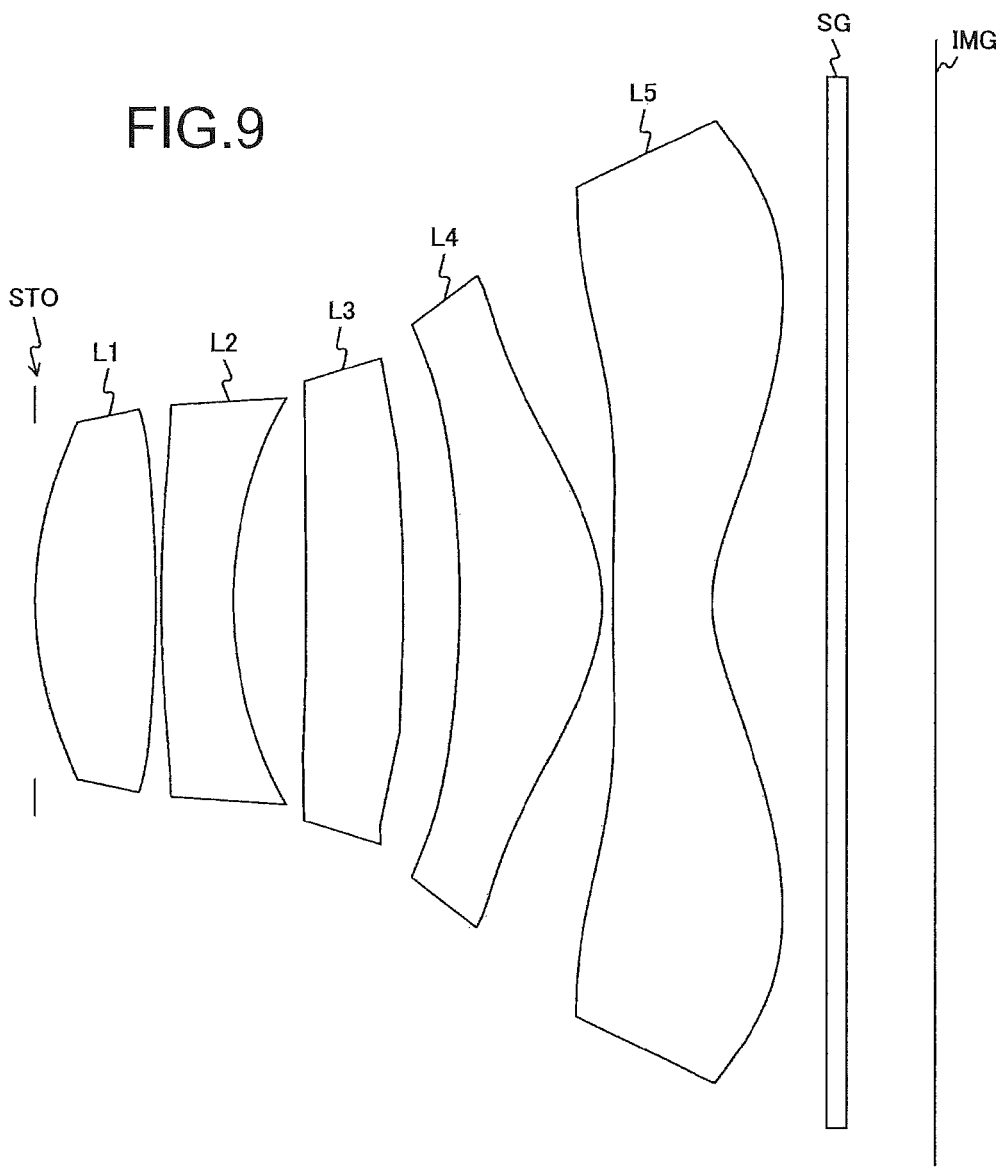

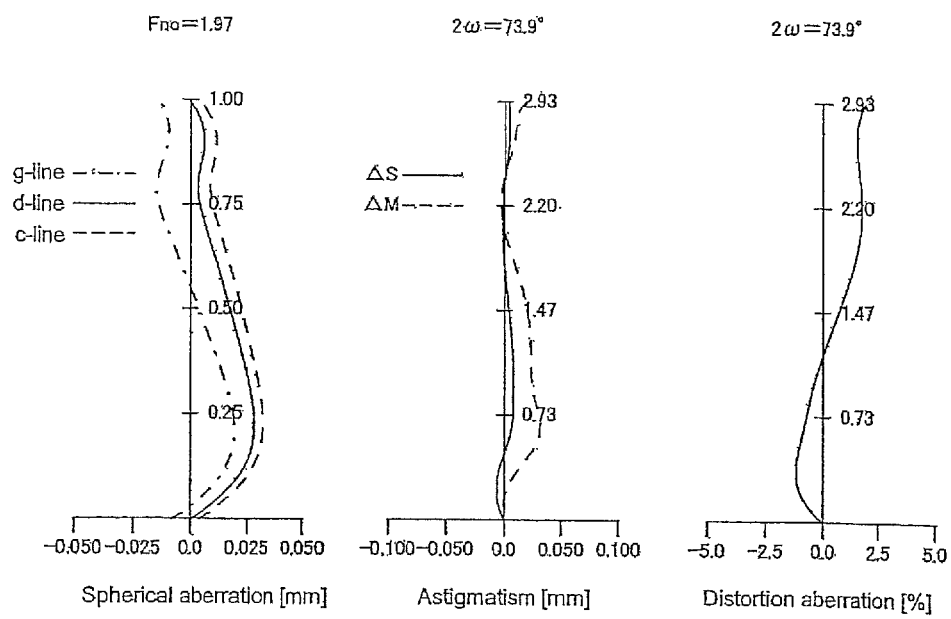

IMAGING LENS AND IMAGING APPARATUS

BACKGROUND

The present technology relates to an imaging lens and an imaging apparatus using the imaging lens. Specifically, the present technology relates to a large-diameter imaging lens having approximately F2.0 that is suitable for a small-sized imaging apparatus such as a camera-equipped mobile phone using a solid-state imaging element.

Camera-equipped mobile phones and digital still cameras using solid-state imaging elements such as CCDs (charge coupled device) and CMOSs (complementary metal oxide semiconductor) have heretofore been known. In such imaging apparatuses, there has been an increasing demand for size reduction, and an incorporated imaging lens having a small size and a short total length has been also demanded. Moreover, in recent years, small-sized imaging equipment such as camera-equipped mobile phones have been reduced in size and a pixel density of imaging elements has become higher, so that models incorporating imaging elements having a high-pixel density of eight million pixels or more have been also popular. Therefore, it has been demanded that imaging lenses to be incorporated into such imaging equipment and apparatuses have high lens performance corresponding to the solid-state imaging element having a high-pixel density.

Meanwhile, in the imaging apparatus, a fine lens having a larger diameter has been demanded for preventing a decrease in sensitivity and an increase in noise of the imaging element caused by narrowing a cell pitch. An imaging lens made of four lenses is frequently used as such a small-sized and high-performance imaging lens (for example, see Japanese Patent Application Laid-Open Nos. 2009-265245 and 2010-049113).

SUMMARY

The lens according to the related art described above is the imaging lens made of four lenses corresponding to the current imaging element having a high-pixel density, and ensures a small size and high optical performance by achieving a well-balanced compensation for various types of aberration while limiting a total optical length. However, these imaging lenses are optimized at approximately F2.8 and when these imaging lenses are increased in diameter of approximately F2.0, a compensation of spherical aberrations of axial aberrations, coma aberrations of off-axis aberrations, and a field curvature is insufficient, which makes it difficult to ensure necessary optical performance. Moreover, it is necessary to further suppress axial chromatic aberrations to improve further optical performance, but it is difficult to compensate the axial chromatic aberrations while suppressing the total optical length in the related art described above and it is also difficult to ensure high resolution performance necessary for increasing the diameter.

The present technology has been conceived in view of the above-described circumstances so as to provide an inexpensive imaging lens which has excellent optical performance corresponding to the imaging element having a high-pixel density and has a small size and a large diameter.

According to a first embodiment of the present technology, there is provided an imaging lens including: in order from an object side thereof, a first lens having a positive refractive power; a second lens formed in a meniscus shape having a negative refractive power with a concave surface faced to an image side; a third lens formed in a biconvex shape having a positive refractive power near an optical axis; a fourth lens formed in a meniscus shape having a positive refractive power with a concave surface faced to the object side near the optical axis; and a fifth lens having a negative refractive power near the optical axis and a positive refractive power in a peripheral portion, the imaging lens satisfying the following conditional expression (a), $$3.0 \le f3/f4 \le 30.0 \tag{a}$$

where f3 is a focal length of the third lens, and f4 is a focal length of the fourth lens. Therefore, an inexpensive imaging lens which has excellent optical performance corresponding to an imaging element having a high-pixel density and has a small size and a large diameter is realized.

Moreover, according to the first embodiment of the present technology, the imaging lens may further satisfy the following conditional expressions (b), (c), (d), and (e):

$$vd1 > 50 \tag{b}$$

$$vd2 < 30 \tag{c}$$

$$vd3 > 50 \tag{d; and}$$

$$vd4 > 50 \tag{e}$$

where vd1 is an Abbe number of the first lens with respect to a d-line (wavelength 587.6 nm), vd2 is an Abbe number of the second lens with respect to a d-line (wavelength 587.6 nm), vd3 is an Abbe number of the third lens with respect to a d-line (wavelength 587.6 nm), and vd4 is an Abbe number of the fourth lens with respect to a d-line (wavelength 587.6 nm). Therefore, an imaging lens which has excellent optical performance corresponding to an imaging element having a high-pixel density and has a small size and a large diameter is realized.

Moreover, according to the first embodiment of the present technology, the imaging lens may further satisfy the following conditional expression (f), $$0.4 < |f1/f2| < 1.2 \tag{f}$$

where f1 is a focal length of the first lens, and f2 is a focal length of the second lens. Therefore, it is realized that excellent optical performance is ensured and the total optical length is suppressed.

Moreover, according to the first embodiment of the present technology, the imaging lens may further satisfy the following conditional expressions (g) and (h):

$$0.2 < |f5/f| < 1.3 \tag{g; and}$$

$$vd5 > 50 \tag{h}$$

where f5 is a focal length of the fifth lens, f is a focal length of an entire lens system including the first lens, the second lens, the third lens, the fourth lens, and the fifth lens, and vd5 is an Abbe number of the fifth lens with respect to a d-line. Therefore, it is realized that excellent optical performance is ensured and the total optical length is suppressed.

Moreover, according to the first embodiment of the present technology, the first lens, the second lens, the third lens, the fourth lens, and the fifth lens may be constituted of resin-made lenses. Therefore, a variation of a field curvature which is a problem when a temperature variation occurs is suppressed while mass-productivity is ensured.

Moreover, according to a second embodiment of the present technology, there is provided an imaging apparatus including: an imaging lens including, in order from an object side thereof, a first lens having a positive refractive power, a second lens formed in a meniscus shape having a negative refractive power with a concave surface faced to an image side, a third lens formed in a biconvex shape having a positive refractive power near an optical axis, a fourth lens formed in a meniscus shape having a positive refractive power with a concave surface faced to the object side near the optical axis, and a fifth lens having a negative refractive power near the optical axis and a positive refractive power in a peripheral portion; and an imaging element configured to convert an optical image formed by the imaging lens into an electric signal, the imaging apparatus satisfying the following conditional expression (a), $$3.0 \le f3/f4 \le 30.0 \qquad (a)$$

where f3 is a focal length of the third lens, and f4 is a focal length of the fourth lens. Therefore, the imaging apparatus including an inexpensive imaging lens which has excellent optical performance corresponding to an imaging element having a high-pixel density and has a small size and a large diameter is realized.

According to the present technology, it is possible to obtain an excellent effect that an inexpensive imaging lens which has excellent optical performance corresponding to an imaging element having a high-pixel density and has a small size and a large diameter can be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1 is a diagram showing a lens configuration of an imaging lens according to a first embodiment of the present technology;

FIGS. 2A-2C are aberration diagrams of the imaging lens according to the first embodiment of the present technology;

FIG. 3 is a diagram showing a lens configuration of an imaging lens according to a second embodiment of the present technology;

FIG. 7 is a diagram showing a lens configuration of an imaging lens according to a fourth embodiment of the present technology;

FIG. 9 is a diagram showing a lens configuration of an imaging lens according to a fifth embodiment of the present technology;

FIGS. 10A-10C are aberration diagrams of the imaging lens according to the fifth embodiment of the present technology.

DETAILED DESCRIPTION OF EMBODIMENTS

Figures 4A, 4B, 4C:
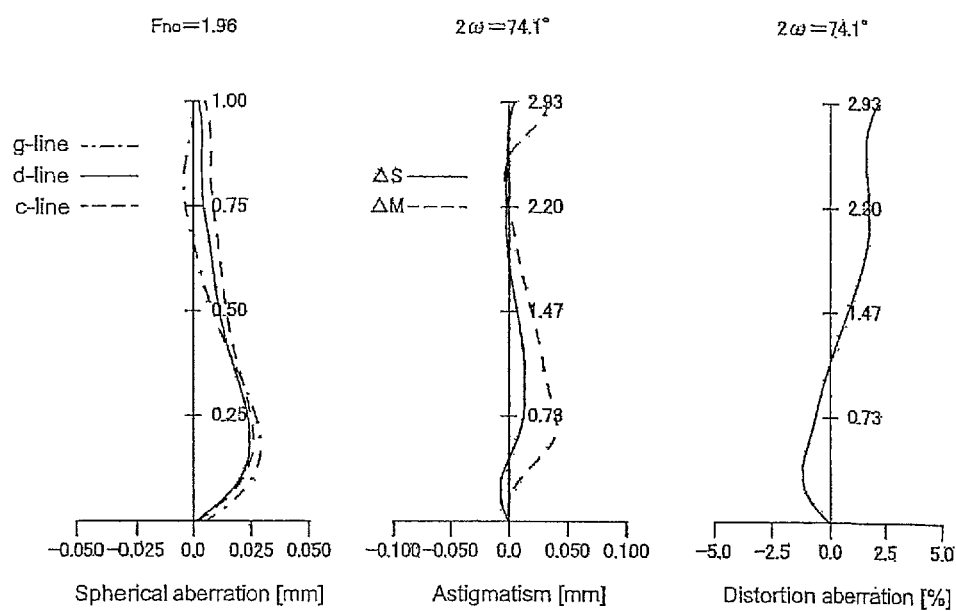
FIGS. 4A-4C are aberration diagrams of the imaging lens according to the second embodiment of the present technology.

An imaging lens according to one embodiment of the present disclosure includes, in order from an object side thereof, a first lens having a positive refractive power, a second lens having a negative refractive power, a third lens having a positive refractive power, a fourth lens having a positive refractive power, and a fifth lens having a positive refractive power. The second lens is a lens formed in a meniscus shape having a negative refractive power with a concave surface faced to an image side. The third lens is a lens formed in a biconvex shape having a positive refractive power near an optical axis. The fourth lens is a lens formed in a meniscus shape having a positive refractive power with a concave surface faced to the object side near the optical axis. The fifth lens is a lens having a negative refractive power near the optical axis and a positive refractive power in a peripheral portion. It should be noted that a seal glass for protecting the imaging element is disposed between the fifth lens and an imaging plane.

The imaging lens according to one embodiment of the present disclosure is configured to satisfy the following conditional expression (a):

$$3.0 \le f3/f4 \le 30.0 \qquad \text{conditional expression (a)}$$

where f3 is a focal length of the third lens, and f4 is a focal length of the fourth lens. By setting the imaging lens so as to satisfy the conditional expression (a), it can be realized that excellent optical performance is ensured and the total optical length is suppressed. The conditional expression (a) defines the ratio between the focal length of the third lens and the focal length of the fourth lens and restricts refractive-power balance. If the ratio exceeds the upper limit value of the conditional expression (a), it is difficult to compensate a coma aberration and a field curvature. Meanwhile, although it is advantageous for aberration compensation if the ratio falls below the lower limit value of the conditional expression, the total optical length is increased, so that it is difficult to make the present lens system necessary for a camera-equipped mobile phone smaller in size and lower in height.

It is suitable that the following conditional expression (a') is satisfied in the range of the conditional expression (a) to achieve well-balanced decrease in the total optical length and compensation of the coma aberration and the field curvature.

$$3.0 \le f3/f4 \le 12.0 \qquad \text{conditional expression (a')}$$

Moreover, the imaging lens according to one embodiment of the present disclosure is configured to satisfy the following conditional expressions (b), (c), (d), and (e):

$$vd1 > 50 \qquad \text{conditional expression (b)}$$

$$vd2 < 30 \qquad \text{conditional expression (c)}$$

$$vd3 > 50 \qquad \text{conditional expression (d); and}$$

$$vd4 > 50 \qquad \text{conditional expression (e)}$$

where vd1 is an Abbe number of the first lens with respect to a d-line (wavelength 587.6 nm), vd2 is an Abbe number of the second lens with respect to a d-line, vd3 is an Abbe number of the third lens with respect to a d-line, and vd4 is an Abbe number of the fourth lens with respect to a d-line. By setting the imaging lens so as to satisfy theses conditional expressions, it is possible to realize the imaging lens which has excellent optical performance corresponding to the imaging element having a high-pixel density and has a small size and a large diameter. These conditional expressions are conditions for successfully compensating a chromatic aberration caused by the lens system. In a case where the values specified in these conditional expressions are not satisfied, it is difficult to compensate an axial chromatic aberration necessary for increasing the lense diameter having F2.0 or less.

Moreover, the imaging lens according to one embodiment of the present disclosure is configured to satisfy the following conditional expression (f):

$$0.4 < |f1/f2| < 1.2 \quad \text{conditional expression (f)}$$

where f1 is a focal length of the first lens, and f2 is a focal length of the second lens. By setting the imaging lens so as to satisfy the conditional expression (f), it can be realized that excellent optical performance is ensured and the total optical length is suppressed. The conditional expression (f) defines the ratio between the focal length of the first lens and the focal length of the second lens and restricts refractive-power balance. Although it is advantageous for aberration compensation if the ratio exceeds the upper limit value of the conditional expression (f), the total optical length is increased, so that it is difficult to realize size reduction necessary for the present lens system. Meanwhile, if the ratio falls below the lower limit value of the conditional expression, it is difficult to compensate the axial chromatic aberration.

It is suitable that the following conditional expression (f') is satisfied in the range of the conditional expression (f) to achieve well-balanced decrease in the total optical length and compensation of the axial chromatic aberration.

$$0.5 < |f1/f2| < 1.0 \quad \text{conditional expression (f')}$$

Moreover, the imaging lens according to one embodiment of the present disclosure is configured to satisfy the following conditional expressions (g) and (h):

$$0.2 < |f5/f1| < 1.3 \quad \text{conditional expression (g); and}$$

$$vd5 > 50 \quad \text{conditional expression (h)}$$

where f5 is a focal length of the fifth lens and f is a focal length of the entire lens system. Moreover, vd5 is an Abbe number of the fifth lens with respect to a d-line. By setting the imaging lens so as to satisfy the conditional expressions (g) and (h), it can be realized that excellent optical performance is ensured and the total optical length is suppressed. The conditional expression (g) defines the ratio between the focal length of the fifth lens and the focal length of the entire lens system and restricts refractive power of the fifth lens. Although it is advantageous for aberration compensation if the ratio exceeds the upper limit value of the conditional expression (g), the total optical length is increased, so that it is difficult to realize size reduction necessary for the present lens system. Meanwhile, although it is advantageous for the size reduction if the ratio falls below the lower limit value of the conditional expression, it is difficult to achieve well-balanced compensation of the field curvature generated at an intermediate image height from the center. Moreover, the conditional expression (h) defines an Abbe number of the fifth lens with respect to a d-line and is a condition for successfully compensating a chromatic aberration caused by the lens system. In a case where the value specified in the conditional expression is not satisfied, it is difficult to achieve well-balanced compensation of the axial chromatic aberration and a chromatic aberration of magnification.

Moreover, in the imaging lens according to one embodiment of the present disclosure, all lenses from the first lens to the fifth lens are constituted of resin-made lenses. All the lenses are constituted of inexpensive resin-made lenses, so that the variation of the field curvature which is a problem when the temperature variation occurs can be suppressed while mass-productivity is ensured.

Herein, the imaging lens including five lenses from the first lens to the fifth lens will be described, but may further include a lens which has substantially no lens power. In this case as well, there is no influence on the performance of the entire imaging lens system.

The imaging lens according to one embodiment of the present disclosure improves the chromatic aberration by adopting such a power arrangement and can achieve well-balanced compensation of the coma aberration and the field curvature by employing a high-order aspherical lens having high flexibility, particularly in the third lens to the fifth lens.

Hereinafter, embodiments for carrying out the present technology (hereinafter, referred to as embodiments) will be described. It should be noted that the descriptions will be given below in the following order.
1. First embodiment (numerical example 1)
2. Second embodiment (numerical example 2)
3. Third embodiment (numerical example 3)
4. Fourth embodiment (numerical example 4)
5. Fifth embodiment (numerical example 5)
6. Application examples (imaging apparatus)

It should be noted that meanings of signs shown in the following respective tables and explanations and the like are as follows. That is, "Fno" is an open F value (F-number). "f" is a focal length of the entire lens system. "2ω" is a diagonal angle of view. "Si" is the i-th surface number counted from an object side. "Ri" is a radius of curvature of the surface Si. "di" is a surface distance between the i-th surface and the i+1th surface from the object side. "ni" is a refractive index at a d-line (wavelength: 587.6 nm) of the i-th lens. "vi" is the Abbe number at the d-line of the i-th lens. Moreover, "∞" represents that the surface is a flat surface, and "ASP" represents that the surface is an aspherical surface.

Moreover, in the imaging lenses used in the embodiments, a lens surface is constituted of an aspheric surface. Assuming that the depth of the aspherical surface is represented by "Z," and the height from the optical axis is represented by "Y," the aspheric shape is defined by the following expression:

$$Z = (Y^2/R)/(1+(1-(1+\kappa)(Y/R)^2)^{1/2}) + AY^3 + BY^4 + CY^5 + DY^6 + EY^7 + FY^8 + GY^9 + HY^{10} + IY^{11} + TY^{12} + LY^{13} + MY^{14} + NY^{15} + PY^{16}$$

where R is a radius of curvature and κ is a conic constant. Moreover, A, B, C, D, E, F, G, H, I, J, L, M, N, and P are third, fourth, fifth, sixth, seventh, eighth, ninth, tenth, eleventh, twelfth, thirteenth, fourteenth, fifteenth, and sixteenth aspheric surface coefficients, respectively.

1. First Embodiment
[Lens Configuration]

FIG. 1 is a diagram showing a lens configuration of an imaging lens according to a first embodiment of the present technology. The lens according to the first embodiment includes, in order from an object side to an image surface IMG, a first lens L1, a second lens L2, a third lens L3, a fourth lens L4, and a fifth lens L5. The first lens L1 is a lens having a positive refractive power. The second lens L2 is a lens formed in a meniscus shape having a negative refractive power with a concave surface faced to an image side. The third lens L3 is a lens formed in a biconvex shape having a positive refractive power near an optical axis. The fourth lens L4 is a lens formed in a meniscus shape having a positive refractive power with a concave surface faced to the object side near the optical axis. The fifth lens L5 is a lens having a negative refractive power near the optical axis and a positive refractive power in a peripheral portion. The meniscus shape is a shape in which both surfaces have curved surfaces in the same direction and each of the surfaces has the same sign of curvature. Moreover, an aperture STO is disposed between the first lens L1 and the second lens L2 and a seal glass SG is disposed between the fifth lens L5 and the image surface IMG.

[Specifications of Lens]

Table 1 shows lens data of a numerical example 1 where specific numerical values are applied to the imaging lens according to the first embodiment.

TABLE 1

| Si | Ri | Aspherical surface | di | ni | vi |
|---|---|---|---|---|---|
| 1 | 2.298 | ASP | 0.58 | 1.535 | 56.3 |
| 2 | −4.334 | ASP | 0.03 | | |
| 3 | STO | | 0 | | |
| 4 | 4.308 | ASP | 0.40 | 1.635 | 23.9 |
| 5 | 1.502 | ASP | 0.37 | | |
| 6 | 7.411 | ASP | 0.54 | 1.535 | 56.3 |
| 7 | −16.433 | ASP | 0.35 | | |
| 8 | −2.033 | ASP | 0.61 | 1.535 | 56.3 |
| 9 | −1.025 | ASP | 0.04 | | |
| 10 | 3.419 | ASP | 0.76 | 1.535 | 56.3 |
| 11 | 1.010 | ASP | 0.62 | | |
| 12 | ∞ | | 0.10 | 1.517 | 64.2 |
| 13 | ∞ | | 0.50 | | |
| 14 | IMG | | | | |

The surfaces of the imaging lens according to the first embodiment have the aspherical shapes as described above. Table 2 shows a conical constant κ of each of the surfaces and each order aspherical coefficient. In Table 2, "E-xx" represents an exponential expression having a base of 10. For example, "E-01" represents "$10^{-1}$".

TABLE 2

| Si | κ | A | B | C | D | E | F | G |
|---|---|---|---|---|---|---|---|---|
| 1 | −1.1073 | 0 | −2.199E−03 | 0 | −3.375E−02 | 0 | 1.866E−02 | 0 |
| 2 | −7.4724 | 0 | 4.582E−02 | 0 | −7.965E−02 | 0 | 8.529E−03 | 0 |
| 4 | −2.5384 | 0 | −3.677E−02 | 0 | 8.096E−02 | 0 | −1.257E−01 | 0 |
| 5 | −5.8601 | 0 | 5.420E−02 | 0 | 3.595E−02 | 0 | −5.396E−02 | 0 |
| 6 | −10.0000 | 0 | −7.301E−02 | 0 | 4.798E−02 | 0 | 4.178E−03 | 0 |
| 7 | 0.0000 | 0 | −5.295E−02 | 0 | −6.708E−04 | 0 | 2.432E−03 | 0 |
| 8 | −9.0151 | 0 | 1.631E−02 | 0 | −1.124E−02 | 0 | 3.886E−03 | 0 |
| 9 | −3.7808 | 0 | −2.511E−02 | 0 | 3.135E−02 | 0 | −2.648E−03 | 0 |
| 10 | −0.6844 | 0 | −9.919E−02 | 0 | 1.669E−02 | 0 | −2.138E−05 | 0 |
| 11 | −5.3942 | −2.959E−02 | −2.168E−02 | −1.922E−04 | 4.241E−03 | −1.519E−04 | −7.521E−04 | 5.338E−05 |

| Si | H | I | J | L | M | N | P |
|---|---|---|---|---|---|---|---|
| 1 | −2.748E−02 | 0 | 0 | 0 | 0 | 0 | 0 |
| 2 | 2.262E−04 | 0 | 0 | 0 | 0 | 0 | 0 |
| 4 | 7.041E−02 | 0 | 0 | 0 | 0 | 0 | 0 |
| 5 | 2.382E−02 | 0 | 0 | 0 | 0 | 0 | 0 |
| 6 | −1.521E−03 | 0 | 0 | 0 | 0 | 0 | 0 |
| 7 | 5.802E−03 | 0 | 6.309E−05 | 0 | 1.775E−04 | 0 | 1.721E−05 |
| 8 | −7.350E−05 | 0 | −2.284E−06 | 0 | 0 | 0 | 0 |
| 9 | −7.761E−04 | 0 | −1.975E−06 | 0 | 0 | 0 | 0 |
| 10 | −1.414E−04 | 0 | −3.384E−07 | 0 | 0 | 0 | 0 |
| 11 | 5.180E−05 | −4.986E−06 | −5.134E−07 | 0 | 0 | 0 | 0 |

Moreover, in the imaging lens according to the first embodiment, an open F value Fno is "2.07," a focal length f is "3.69," and a diagonal angle of view is "75.8°."

[Aberration of Lens]

FIGS. 2A-2C are aberration diagrams of the imaging lens according to the first embodiment of the present technology. FIG. 2A shows a spherical aberration diagram, FIG. 2B shows an astigmatism diagram, and FIG. 2C shows a distortion aberration diagram. In the spherical aberration diagram, a solid line represents a value at a d-line (wavelength 587.6 nm), a broken line represents a value at a c-line (wavelength 656.3 nm), and a single-dotted chain line represents a value at a g-line (wavelength 435.8 nm). Moreover, in the astigmatism diagram, a solid line S represents a value on a sagittal image surface, and a broken line M represents a value on a meridional image surface.

It can be known from these aberration diagrams that the imaging lens according to the first embodiment has various types of appropriately compensated aberrations and excellent imaging performance.

2. Second Embodiment

[Lens Configuration]

FIG. 3 is a diagram showing a lens configuration of an imaging lens according to a second embodiment of the present technology. The lens according to the second embodiment includes, in order from an object side to an image surface IMG, a first lens L1, a second lens L2, a third lens L3, a fourth lens L4, and a fifth lens L5. The first lens L1 is a lens having a positive refractive power. The second lens L2 is a lens formed in a meniscus shape having a negative refractive power with a concave surface faced to an image side. The third lens L3 is a lens formed in a biconvex shape having a positive refractive power near an optical axis. The fourth lens L4 is a lens formed in a meniscus shape having a positive refractive power with a concave surface faced to the object side near the optical axis. The fifth lens L5 is a lens having a negative refractive power near the optical axis and a positive refractive power in a peripheral portion. Moreover, an aperture STO is disposed on the object side of the first lens L1 and a seal glass SG is disposed between the fifth lens L5 and the image surface IMG.

[Specifications of Lens]

Table 3 shows lens data of a numerical example 2 where specific numerical values are applied to the imaging lens according to the second embodiment.

TABLE 3

| Si | Ri | Aspherical surface | di | ni | vi |
|---|---|---|---|---|---|
| 1 | STO | | 0 | | |
| 2 | 2.046 | ASP | 0.64 | 1.535 | 56.3 |
| 3 | −6.892 | ASP | 0.03 | | |

TABLE 3-continued

| Si | Ri | Aspherical surface | di | ni | vi |
|---|---|---|---|---|---|
| 4 | 5.688 | ASP | 0.40 | 1.645 | 21.5 |
| 5 | 1.853 | ASP | 0.36 | | |
| 6 | 8.449 | ASP | 0.57 | 1.535 | 56.3 |
| 7 | −10000 | ASP | 0.37 | | |
| 8 | −3.698 | ASP | 0.79 | 1.535 | 56.3 |
| 9 | −0.872 | ASP | 0.03 | | |
| 10 | 6.510 | ASP | 0.58 | 1.535 | 56.3 |
| 11 | 0.797 | ASP | 0.61 | | |
| 12 | ∞ | | 0.11 | 1.512 | 56.9 |
| 13 | ∞ | | 0.50 | | |
| 14 | IMG | | | | |

The surfaces of the imaging lens according to the second embodiment have the aspherical shapes as described above. Table 4 shows a conical constant κ of each of the surfaces and each order aspherical coefficient.

TABLE 4

| Si | κ | A | B | C | D | E | F | G |
|---|---|---|---|---|---|---|---|---|
| 2 | −0.5254 | 0 | 7.551E−03 | 0 | −1.786E−02 | 0 | 2.539E−02 | 0 |
| 3 | −0.4485 | 0 | 6.378E−02 | 0 | −4.134E−02 | 0 | −1.714E−02 | 0 |
| 4 | −9.9999 | −7.755E−03 | 1.638E−02 | −2.530E−02 | 5.536E−02 | 1.431E−02 | −1.014E−01 | −4.807E−03 |
| 5 | −8.6950 | 1.717E−02 | 3.345E−02 | −1.041E−03 | 3.749E−02 | 3.410E−03 | −5.309E−02 | −4.650E−03 |
| 6 | 2.1625 | −6.374E−04 | −5.314E−02 | −1.836E−02 | 2.505E−02 | −8.872E−03 | 1.028E−03 | 3.938E−03 |
| 7 | 10.0000 | 1.222E−02 | −4.075E−02 | 7.873E−03 | −1.472E−02 | −5.883E−03 | −3.222E−03 | −2.997E−04 |
| 8 | −0.1493 | 1.013E−02 | 4.057E−02 | 3.232E−03 | −1.317E−02 | −1.642E−04 | −5.343E−03 | −2.381E−03 |
| 9 | −4.2769 | −3.290E−02 | −2.408E−02 | 9.283E−03 | 2.433E−02 | −1.279E−02 | −2.083E−03 | 2.883E−05 |
| 10 | 4.8774 | −2.192E−02 | −7.935E−02 | 3.388E−03 | 1.558E−02 | −1.921E−04 | −1.346E−04 | −8.466E−05 |
| 11 | −4.5256 | −1.063E−01 | 3.361E−02 | −6.815E−03 | −4.262E−04 | 8.178E−04 | −4.614E−04 | 1.747E−05 |

| Si | H | I | J | L | M | N | P |
|---|---|---|---|---|---|---|---|
| 2 | −2.068E−02 | 0 | 0 | 0 | 0 | 0 | 0 |
| 3 | 4.833E−03 | 0 | 0 | 0 | 0 | 0 | 0 |
| 4 | 4.337E−02 | 0 | 0 | 0 | 0 | 0 | 0 |
| 5 | 2.544E−02 | 0 | 0 | 0 | 0 | 0 | 0 |
| 6 | 8.252E−03 | 0 | 0 | 0 | 0 | 0 | 0 |
| 7 | 4.067E−03 | 3.660E−04 | 4.547E−04 | 4.812E−05 | 5.435E−04 | 9.809E−05 | 3.547E−04 |
| 8 | −5.826E−04 | 4.287E−04 | 1.157E−03 | 0 | 0 | 0 | 0 |
| 9 | −4.876E−04 | 5.290E−06 | −2.716E−05 | 0 | 0 | 0 | 0 |
| 10 | −1.434E−04 | −4.362E−06 | 1.207E−06 | 6.513E−07 | 1.057E−06 | 0 | 0 |
| 11 | 2.289E−05 | −1.621E−05 | 2.440E−06 | 4.205E−07 | 2.842E−07 | 0 | 0 |

Moreover, in the imaging lens according to the second embodiment, an open F value Fno is "1.96," a focal length f is "3.80," and a diagonal angle of view is "74.1°."

[Aberration of Lens]

FIGS. 4A-4C are aberration diagrams of the imaging lens according to the second embodiment of the present technology. FIG. 4A shows a spherical aberration diagram, FIG. 4B shows an astigmatism diagram, and FIG. 4C shows a distortion aberration diagram. It should be noted that the kinds of lines in the respective aberration diagrams are the same as those described in the first embodiment.

It can be known from these aberration diagrams that the imaging lens according to the second embodiment has various types of appropriately compensated aberrations and excellent imaging performance.

3. Third Embodiment

[Lens Configuration]

Figure 5:
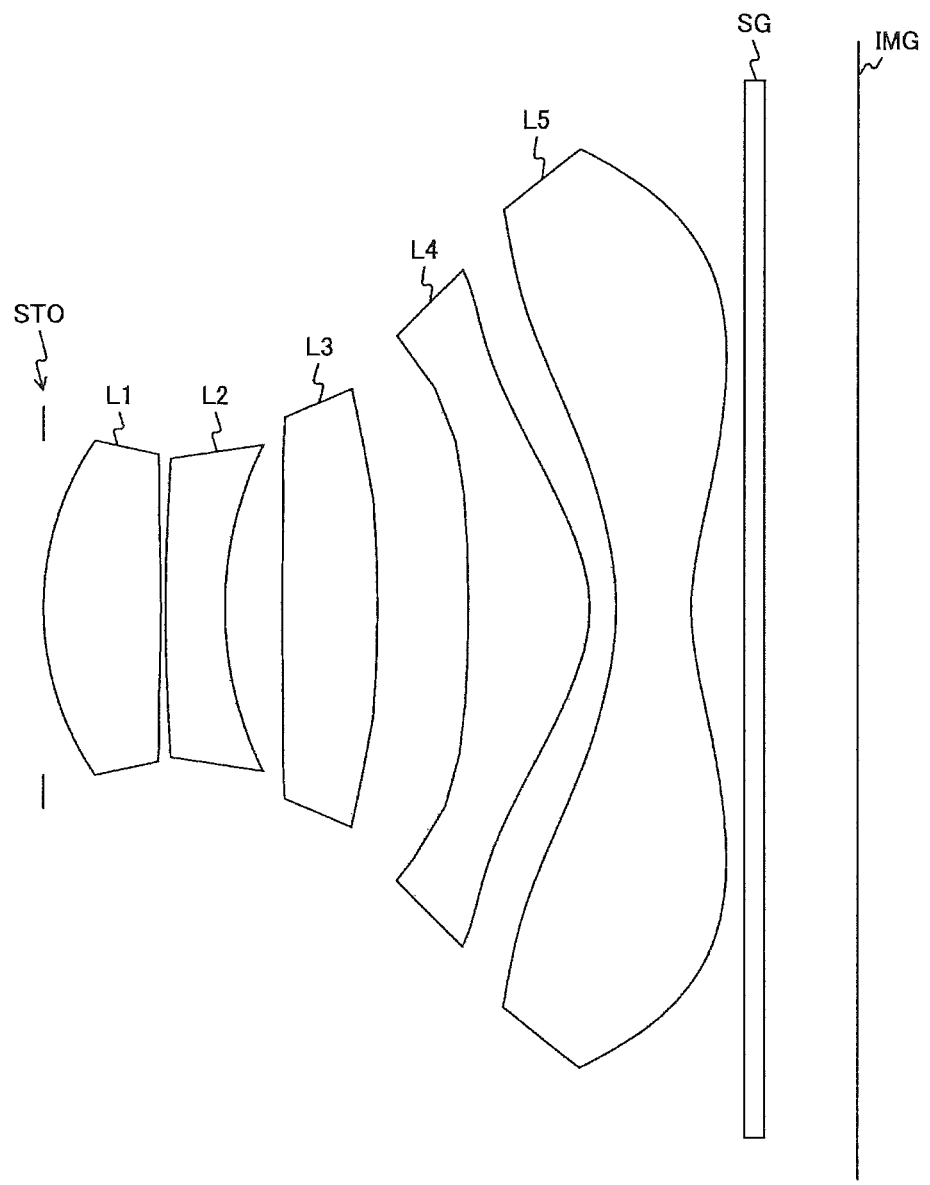
FIG. 5 is a diagram showing a lens configuration of an imaging lens according to a third embodiment of the present technology.

FIG. 5 is a diagram showing a lens configuration of an imaging lens according to a third embodiment of the present technology. The lens according to the third embodiment includes, in order from an object side to an image surface IMG, a first lens L1, a second lens L2, a third lens L3, a fourth lens L4, and a fifth lens L5. The first lens L1 is a lens having a positive refractive power. The second lens L2 is a lens formed in a meniscus shape having a negative refractive power with a concave surface faced to an image side. The third lens L3 is a lens formed in a biconvex shape having a positive refractive power near an optical axis. The fourth lens L4 is a lens formed in a meniscus shape having a positive refractive power with a concave surface faced to the object side near the optical axis. The fifth lens L5 is a lens having a negative refractive power near the optical axis and a positive refractive power in a peripheral portion. Moreover, an aperture STO is disposed on the object side of the first lens L1 and a seal glass SG is disposed between the fifth lens L5 and the image surface IMG.

[Specifications of Lens]

Table 5 shows lens data of a numerical example 3 where specific numerical values are applied to the imaging lens according to the third embodiment.

TABLE 5

| Si | Ri | Aspherical surface | di | ni | vi |
|---|---|---|---|---|---|
| 1 | STO | | 0 | | |
| 2 | 1.555 | ASP | 0.63 | 1.535 | 56.3 |
| 3 | −7.546 | ASP | 0.03 | | |
| 4 | 10.203 | ASP | 0.32 | 1.635 | 23.9 |
| 5 | 1.785 | ASP | 0.30 | | |
| 6 | 9.869 | ASP | 0.51 | 1.535 | 56.3 |
| 7 | −12.928 | ASP | 0.48 | | |
| 8 | −12.299 | ASP | 0.65 | 1.535 | 56.3 |
| 9 | −0.802 | ASP | 0.14 | | |
| 10 | −1.491 | ASP | 0.40 | 1.535 | 56.3 |
| 11 | 1.223 | ASP | 0.28 | | |
| 12 | ∞ | | 0.11 | 1.512 | 56.9 |
| 13 | ∞ | | 0.50 | | |
| 14 | IMG | | | | |

The surfaces of the imaging lens according to the third embodiment have the aspherical shapes as described above. Table 6 shows a conical constant κ of each of the surfaces and each order aspherical coefficient.

TABLE 6

| Si | κ | A | B | C | D | E | F | G |
|---|---|---|---|---|---|---|---|---|
| 2 | −0.2587 | 0 | 1.627E−02 | 0 | −7.081E−03 | 0 | 3.653E−02 | 0 |
| 3 | −10.0000 | 0 | 1.156E−01 | 0 | −4.665E−02 | 0 | −2.231E−02 | 0 |
| 4 | 1.5307 | −1.362E−02 | 3.728E−02 | −3.293E−02 | 7.170E−02 | 2.294E−02 | −1.532E−01 | −2.986E−02 |
| 5 | −9.2073 | 1.013E−02 | 5.681E−02 | 1.942E−02 | 6.056E−02 | −3.447E−03 | −9.673E−02 | −1.718E−02 |
| 6 | −10.0000 | −9.878E−03 | −6.219E−02 | −2.241E−02 | 3.395E−02 | −1.344E−02 | 1.664E−03 | 5.884E−03 |
| 7 | 9.4743 | −1.057E−02 | −6.556E−02 | 8.085E−03 | −1.981E−02 | −7.423E−03 | −3.387E−03 | 7.909E−04 |
| 8 | 10.0000 | −2.461E−02 | −4.030E−02 | −1.542E−03 | 1.022E−02 | 1.197E−02 | −1.178E−02 | −1.039E−02 |
| 9 | −4.8074 | −1.040E−01 | 1.316E−02 | 2.286E−02 | 2.868E−02 | −4.181E−03 | −4.174E−03 | −3.487E−04 |
| 10 | −9.4740 | 1.181E−02 | −7.970E−02 | 9.198E−03 | 2.175E−02 | −3.684E−04 | −4.529E−04 | −2.780E−04 |
| 11 | −8.1474 | −1.110E−01 | 4.200E−02 | −6.036E−03 | −3.068E−03 | 6.780E−04 | −5.853E−04 | 8.290E−05 |

| Si | H | I | J | L | M | N | P |
|---|---|---|---|---|---|---|---|
| 2 | −1.781E−02 | 0 | 0 | 0 | 0 | 0 | 0 |
| 3 | −2.267E−02 | 0 | 0 | 0 | 0 | 0 | 0 |
| 4 | 4.220E−02 | 0 | 0 | 0 | 0 | 0 | 0 |
| 5 | 7.941E−02 | 0 | 0 | 0 | 0 | 0 | 0 |
| 6 | 3.517E−02 | 0 | 0 | 0 | 0 | 0 | 0 |
| 7 | 7.892E−03 | 2.316E−03 | 2.487E−03 | 1.859E−03 | 3.016E−03 | 1.195E−03 | 5.890E−04 |
| 8 | −4.806E−03 | 6.746E−04 | 4.382E−03 | 0 | 0 | 0 | 0 |
| 9 | −8.834E−04 | 1.112E−04 | 1.115E−04 | 0 | 0 | 0 | 0 |
| 10 | −3.004E−04 | −3.006E−05 | −2.555E−06 | 5.101E−06 | 5.042E−06 | 0 | 0 |
| 11 | 4.430E−05 | −3.290E−05 | 1.572E−06 | 5.569E−09 | 7.151E−07 | 0 | 0 |

Moreover, in the imaging lens according to the third embodiment, an open F value Fno is "2.06," a focal length f is "3.60," and a diagonal angle of view is "75.6°."

[Aberration of Lens]

Figures 6A, 6B, 6C:
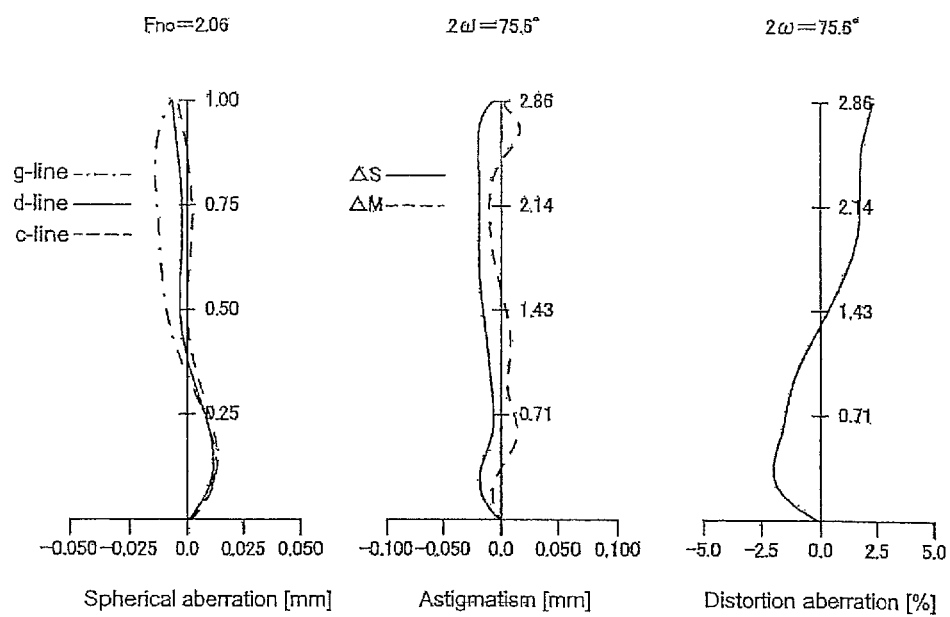
FIGS. 6A-6C are aberration diagrams of the imaging lens according to the third embodiment of the present technology.

FIGS. 6A-6C are aberration diagrams of the imaging lens according to the third embodiment of the present technology. FIG. 6A shows a spherical aberration diagram, FIG. 6B shows an astigmatism diagram, and FIG. 6C shows a distortion aberration diagram. It should be noted that the kinds of lines in the respective aberration diagrams are the same as those described in the first embodiment.

It can be known from these aberration diagrams that the imaging lens according to the third embodiment has various types of appropriately compensated aberrations and excellent imaging performance.

4. Fourth Embodiment

[Lens Configuration]

FIG. 7 is a diagram showing a lens configuration of an imaging lens according to a fourth embodiment of the present technology. The lens according to the fourth embodiment includes, in order from an object side to an image surface IMG, a first lens L1, a second lens L2, a third lens L3, a fourth lens L4, and a fifth lens L5. The first lens L1 is a lens having a positive refractive power. The second lens L2 is a lens formed in a meniscus shape having a negative refractive power with a concave surface faced to an image side. The third lens L3 is a lens formed in a biconvex shape having a positive refractive power near an optical axis. The fourth lens L4 is a lens formed in a meniscus shape having a positive refractive power with a concave surface faced to the object side near the optical axis. The fifth lens L5 is a lens having a negative refractive power near the optical axis and a positive refractive power in a peripheral portion. Moreover, an aperture STO is disposed on the object side of the first lens L1 and a seal glass SG is disposed between the fifth lens L5 and the image surface IMG.

[Specifications of Lens]

Table 7 shows lens data of a numerical example 4 where specific numerical values are applied to the imaging lens according to the fourth embodiment.

TABLE 7

| Si | Ri | Aspherical surface | di | ni | vi |
|---|---|---|---|---|---|
| 1 | STO | | 0 | | |
| 2 | 2.020 | ASP | 0.67 | 1.535 | 56.3 |
| 3 | −5.769 | ASP | 0.03 | | |
| 4 | 7.549 | ASP | 0.40 | 1.635 | 23.9 |
| 5 | 1.921 | ASP | 0.38 | | |
| 6 | 11.662 | ASP | 0.53 | 1.535 | 56.3 |
| 7 | −10000 | ASP | 0.36 | | |
| 8 | −4.680 | ASP | 0.80 | 1.535 | 56.3 |
| 9 | −0.886 | ASP | 0.05 | | |
| 10 | 7.671 | ASP | 0.55 | 1.535 | 56.3 |
| 11 | 0.803 | ASP | 0.62 | | |
| 12 | ∞ | | 0.11 | 1.512 | 56.9 |
| 13 | ∞ | | 0.50 | | |
| 14 | IMG | | | | |

The surfaces of the imaging lens according to the fourth embodiment have the aspherical shapes as described above. Table 8 shows a conical constant κ of each of the surfaces and each order aspherical coefficient.

TABLE 8

| Si | κ | A | B | C | D | E | F | G |
|---|---|---|---|---|---|---|---|---|
| 2 | −0.5713 | 0 | 6.519E−03 | 0 | −1.743E−02 | 0 | 2.619E−02 | 0 |
| 3 | −4.2623 | 0 | 6.422E−02 | 0 | −4.493E−02 | 0 | −1.690E−02 | 0 |
| 4 | −9.9948 | −9.938E−03 | 1.806E−02 | −2.300E−02 | 5.504E−02 | 1.180E−02 | −1.038E−01 | −5.338E−03 |
| 5 | −9.5486 | 1.761E−02 | 3.394E−02 | −2.996E−04 | 3.805E−02 | 4.045E−03 | −5.250E−02 | −4.319E−03 |
| 6 | −8.7195 | −2.982E−03 | −5.486E−02 | −1.723E−02 | 2.648E−02 | −8.782E−03 | 7.567E−04 | 4.088E−03 |
| 7 | 10.0000 | −9.893E−03 | −3.706E−02 | 1.045E−02 | −1.372E−02 | −5.610E−03 | −3.166E−03 | −2.617E−04 |

TABLE 8-continued

| Si | | | | | | | | |
|---|---|---|---|---|---|---|---|---|
| 8 | −0.2973 | −1.931E−02 | 3.977E−02 | 4.512E−03 | −1.235E−02 | 8.146E−04 | −4.413E−03 | −1.830E−03 |
| 9 | −4.3849 | −3.823E−02 | −2.481E−02 | 9.292E−03 | 2.463E−02 | −1.057E−03 | −2.020E−03 | 2.948E−05 |
| 10 | 5.4887 | −1.670E−02 | −7.712E−02 | 3.856E−03 | 1.559E−02 | −2.271E−04 | −1.606E−04 | −9.682E−05 |
| 11 | −4.4438 | −1.042E−01 | 3.267E−02 | −6.824E−03 | −3.144E−04 | 8.738E−04 | −4.498E−04 | 1.974E−05 |

| Si | H | I | J | L | M | N | P |
|---|---|---|---|---|---|---|---|
| 2 | −2.307E−02 | 0 | 0 | 0 | 0 | 0 | 0 |
| 3 | 3.343E−03 | 0 | 0 | 0 | 0 | 0 | 0 |
| 4 | 4.547E−02 | 0 | 0 | 0 | 0 | 0 | 0 |
| 5 | 2.444E−02 | 0 | 0 | 0 | 0 | 0 | 0 |
| 6 | 8.776E−03 | 0 | 0 | 0 | 0 | 0 | 0 |
| 7 | 4.160E−03 | 5.042E−04 | 5.763E−04 | 1.357E−04 | 5.710E−04 | 8.841E−05 | 3.128E−04 |
| 8 | −4.359E−04 | 3.062E−04 | 9.097E−04 | 0 | 0 | 0 | 0 |
| 9 | −4.970E−04 | −7.049E−07 | −3.639E−05 | 0 | 0 | 0 | 0 |
| 10 | −1.477E−04 | −5.356E−06 | 1.269E−06 | 9.087E−07 | 1.251E−06 | 0 | 0 |
| 11 | 2.300E−05 | −1.612E−05 | 2.369E−06 | 3.312E−07 | 2.250E−07 | 0 | 0 |

Moreover, in the imaging lens according to the fourth embodiment, an open F value Fno is "1.97," a focal length f is "3.83," and a diagonal angle of view is "73.8°."

[Aberration of Lens]

Figure 8A:
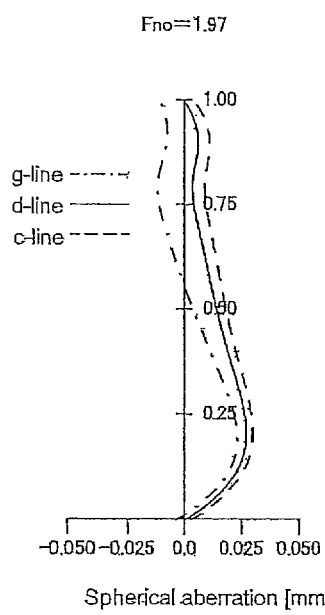
FIGS. 8A-8C are aberration diagrams of the imaging lens according to the fourth embodiment of the present technology.
Figure 8B:
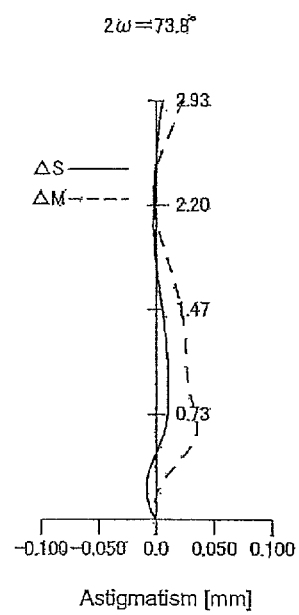
Figure 8C:
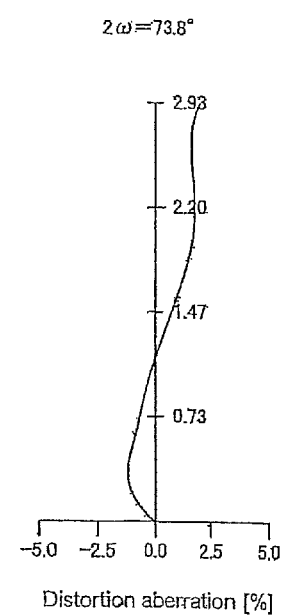

FIGS. 8A-8C are aberration diagrams of the imaging lens according to the fourth embodiment of the present technology. FIG. 8A shows a spherical aberration diagram, FIG. 8B shows an astigmatism diagram, and FIG. 8C shows a distortion aberration diagram. It should be noted that the kinds of lines in the respective aberration diagrams are the same as those described in the first embodiment.

It can be known from these aberration diagrams that the imaging lens according to the fourth embodiment has various types of appropriately compensated aberrations and excellent imaging performance.

5. Fifth Embodiment

[Lens Configuration]

FIG. 9 is a diagram showing a lens configuration of an imaging lens according to a fifth embodiment of the present technology. The lens according to the fifth embodiment includes, in order from an object side to an image surface IMG, a first lens L1, a second lens L2, a third lens L3, a fourth lens L4, and a fifth lens L5. The first lens L1 is a lens having a positive refractive power. The second lens L2 is a lens formed in a meniscus shape having a negative refractive power with a concave surface faced to an image side. The third lens L3 is a lens formed in a biconvex shape having a positive refractive power near an optical axis. The fourth lens L4 is a lens formed in a meniscus shape having a positive refractive power with a concave surface faced to the object side near the optical axis. The fifth lens L5 is a lens having a negative refractive power near the optical axis and a positive refractive power in a peripheral portion. Moreover, an aperture STO is disposed on the object side of the first lens L1 and a seal glass SG is disposed between the fifth lens L5 and the image surface IMG.

[Specifications of Lens]

Table 9 shows lens data of a numerical example 5 where specific numerical values are applied to the imaging lens according to the fifth embodiment.

TABLE 9

| Si | Ri | Aspherical surface | di | ni | vi |
|---|---|---|---|---|---|
| 1 | STO | | 0 | | |
| 2 | 2.021 | ASP | 0.67 | 1.535 | 56.3 |
| 3 | −6.062 | ASP | 0.03 | | |
| 4 | 7.518 | ASP | 0.40 | 1.635 | 23.9 |
| 5 | 2.017 | ASP | 0.41 | | |
| 6 | 26.917 | ASP | 0.54 | 1.535 | 56.3 |
| 7 | −10000 | ASP | 0.32 | | |
| 8 | −6.207 | ASP | 0.79 | 1.535 | 56.3 |
| 9 | −0.909 | ASP | 0.06 | | |
| 10 | 8.139 | ASP | 0.55 | 1.535 | 56.3 |
| 11 | 0.816 | ASP | 0.63 | | |
| 12 | ∞ | | 0.11 | 1.512 | 56.9 |
| 13 | ∞ | | 0.50 | | |
| 14 | IMG | | | | |

The surfaces of the imaging lens according to the fifth embodiment have the aspherical shapes as described above. Table 10 shows a conical constant κ of each of the surfaces and each order aspherical coefficient.

TABLE 10

| Si | κ | A | B | C | D | E | F | G |
|---|---|---|---|---|---|---|---|---|
| 2 | −0.6145 | 0 | 5.547E−03 | 0 | −1.676E−02 | 0 | 2.596E−02 | 0 |
| 3 | 1.9293 | 0 | 6.073E−02 | 0 | −4.435E−02 | 0 | −1.650E−02 | 0 |
| 4 | −8.3814 | −7.796E−03 | 1.825E−02 | −2.445E−02 | 5.418E−02 | 1.152E−02 | −1.038E−01 | −5.189E−03 |
| 5 | −9.9647 | 1.978E−02 | 3.417E−02 | 1.929E−04 | 3.837E−02 | 4.097E−03 | −5.262E−02 | −4.377E−03 |
| 6 | −10.0000 | −3.398E−03 | −5.601E−02 | −1.708E−02 | 2.642E−02 | −8.345E−03 | 1.001E−03 | 4.283E−03 |
| 7 | 10.0000 | −2.151E−02 | −3.983E−02 | 1.086E−02 | −1.330E−02 | −5.638E−03 | −3.345E−03 | −4.663E−04 |
| 8 | 0.0848 | −3.496E−02 | 3.869E−02 | 3.144E−03 | −1.284E−02 | 9.431E−04 | −4.138E−03 | −1.636E−03 |
| 9 | −4.4104 | −3.921E−02 | −2.502E−02 | 9.320E−03 | 2.466E−02 | −1.059E−03 | −2.010E−03 | 4.228E−05 |
| 10 | 5.8559 | −1.726E−02 | −7.566E−02 | 4.219E−03 | 1.562E−02 | −2.410E−04 | −1.750E−04 | −1.038E−04 |
| 11 | −4.3556 | −1.045E−01 | 3.318E−02 | −6.729E−03 | −2.835E−04 | 8.841E−04 | −4.486E−04 | 1.862E−05 |

TABLE 10-continued

| Si | H | I | J | L | M | N | P |
|---|---|---|---|---|---|---|---|
| 2 | −2.418E−02 | 0 | 0 | 0 | 0 | 0 | 0 |
| 3 | 2.683E−03 | 0 | 0 | 0 | 0 | 0 | 0 |
| 4 | 4.589E−02 | 0 | 0 | 0 | 0 | 0 | 0 |
| 5 | 2.448E−02 | 0 | 0 | 0 | 0 | 0 | 0 |
| 6 | 8.881E−03 | 0 | 0 | 0 | 0 | 0 | 0 |
| 7 | 4.031E−03 | 4.181E−04 | 5.464E−04 | 1.292E−04 | 5.680E−04 | 8.193E−05 | 2.978E−04 |
| 8 | −3.598E−04 | 3.066E−04 | 8.652E−04 | 0 | 0 | 0 | 0 |
| 9 | −4.854E−04 | 2.337E−06 | −3.762E−05 | 0 | 0 | 0 | 0 |
| 10 | −1.502E−04 | −5.993E−06 | 1.276E−06 | 1.022E−06 | 1.355E−06 | 0 | 0 |
| 11 | 2.238E−05 | −1.642E−05 | 2.315E−06 | 3.228E−07 | 2.303E−07 | 0 | 0 |

Moreover, in the imaging lens according to the fifth embodiment, an open F value Fno is "1.97," a focal length f is "3.83," and a diagonal angle of view is "73.9°."

[Aberration of Lens]

FIGS. 10A-10C are aberration diagrams of the imaging lens according to the fifth embodiment of the present technology. FIG. 10A shows a spherical aberration diagram, FIG. 10B shows an astigmatism diagram, and FIG. 10C shows a distortion aberration diagram. It should be noted that the kinds of lines in the respective aberration diagrams are the same as those described in the first embodiment.

It can be known from these aberration diagrams that the imaging lens according to the fifth embodiment has various types of appropriately compensated aberrations and excellent imaging performance.

[Summary of Conditional Expressions]

Table 11 shows respective values of the focal length in the numerical examples 1 to 5 according to the first to fifth embodiments.

TABLE 11

| Focal length | Numerical example 1 | Numerical example 2 | Numerical example 3 | Numerical example 4 | Numerical example 5 |
|---|---|---|---|---|---|
| f1 | 2.897 | 3.027 | 2.472 | 2.884 | 2.919 |
| f2 | −3.843 | −4.444 | −3.459 | −4.173 | −4.468 |
| f3 | 9.630 | 15.791 | 10.551 | 21.790 | 50.215 |
| f4 | 3.192 | 1.947 | 1.574 | 1.903 | 1.893 |
| f5 | −3.011 | −1.760 | −1.195 | −1.726 | −1.741 |
| f | 3.69 | 3.80 | 3.60 | 3.83 | 3.83 |

Table 12 shows values obtained by calculating the values corresponding to the conditional expressions (a) to (h) using the values of the focal length in the numerical examples 1 to 5. As is clear from the Table 12, it can be seen that the conditional equations (a) to (h) are satisfied by the values obtained in the numerical examples 1 to 5.

TABLE 12

| Conditional expression | Numerical example 1 | Numerical example 2 | Numerical example 3 | Numerical example 4 | Numerical example 5 |
|---|---|---|---|---|---|
| (a) $3.0 \leq f3/f4 \leq 30.0$ | 3.02 | 8.11 | 6.70 | 11.45 | 26.52 |
| (b) $vd1 > 50$ | 56.3 | 56.3 | 56.3 | 56.3 | 56.3 |
| (c) $vd2 < 30$ | 23.9 | 21.5 | 23.9 | 23.9 | 23.9 |
| (d) $vd3 > 50$ | 56.3 | 56.3 | 56.3 | 56.3 | 56.3 |
| (e) $vd4 > 50$ | 56.3 | 56.3 | 56.3 | 56.3 | 56.3 |
| (f) $0.4 < |f1/f2| < 1.2$ | 0.75 | 0.68 | 0.71 | 0.69 | 0.65 |
| (g) $0.2 < |f5/f| < 1.3$ | 0.82 | 0.46 | 0.33 | 0.45 | 0.46 |
| (h) $vd5 > 50$ | 56.3 | 56.3 | 56.3 | 56.3 | 56.3 |

6. Application Examples

[Configuration of Imaging Apparatus]

Figure 11:
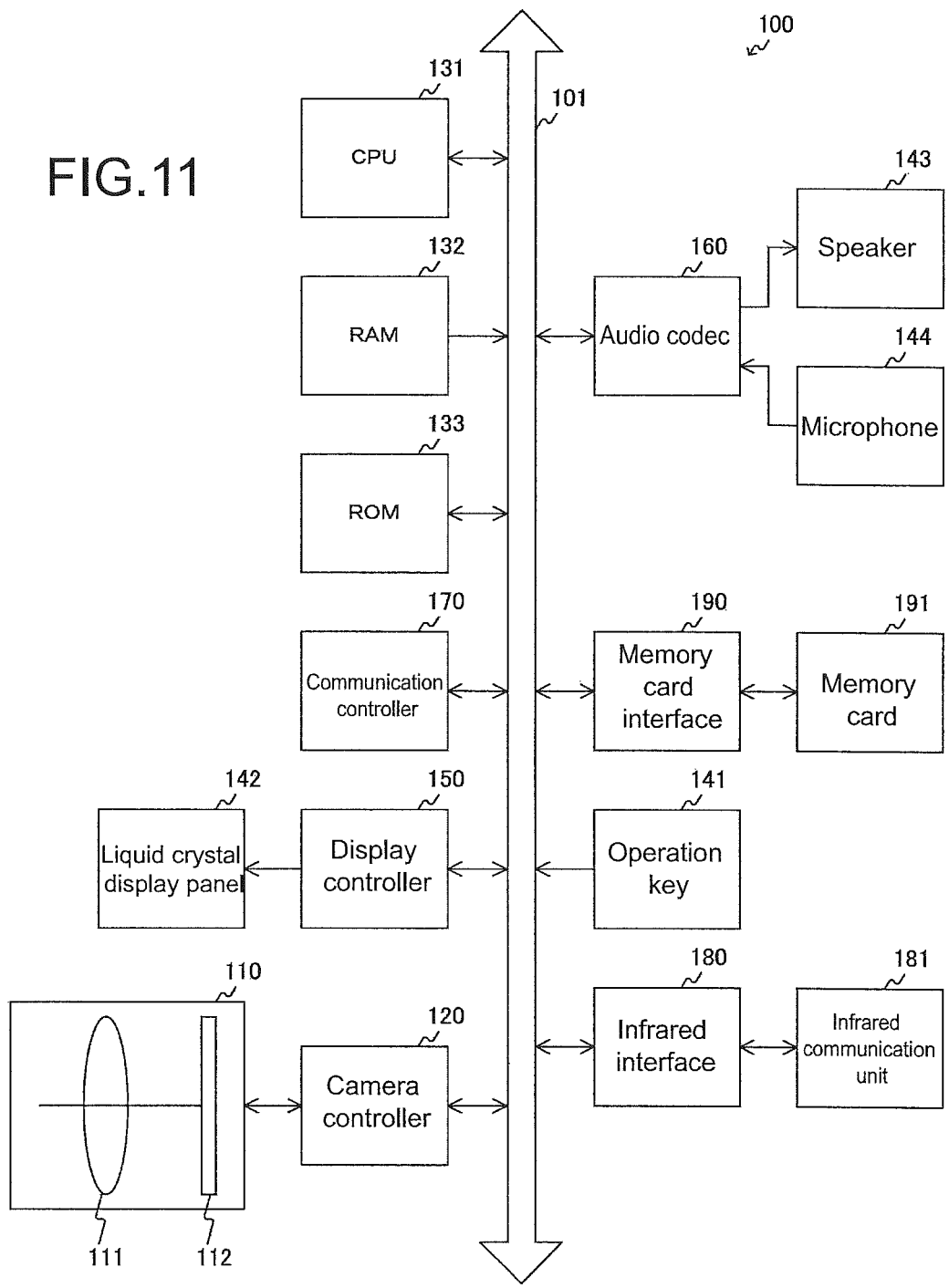
FIG. 11 is a diagram showing an example in which the imaging lenses according to the first embodiment through the fifth embodiment of the present technology are applied to an imaging apparatus.

FIG. 11 is a diagram showing an example in which the imaging lenses according to the first embodiment through the fifth embodiment of the present technology are applied to an imaging apparatus 100. The imaging apparatus 100 includes an optical system 110 having an imaging lens 111 described as the first embodiment to the fifth embodiment, and an imaging element 112 configured to convert an optical image formed by the imaging lens 111 into an electric signal. As the imaging element 112, a CCD sensor, a CMOS sensor or the like is used, for example.

The optical system 110 is controlled by a camera controller 120. The camera controller 120 captures a still picture or a moving picture by controlling the optical system 110. Moreover, the camera controller 120 codes the image data obtained by the capturing using a compression method such as JPEG (joint photographic experts group) and MPEG (moving picture experts group) and transmits the image data to a CPU (central processing unit) 131, a display controller 150, a communication controller 170, a memory card interface 190, and the like through a bus 101.

The imaging apparatus 100 includes the CPU 131 as a processing apparatus which performs control over the entire imaging apparatus 100 through the bus 101. The CPU 131 uses a RAM (random access memory) 132 as a working data region. A program executed by the CPU 131 is stored in a ROM (read-only memory) 133.

The CPU 131 temporarily stores the image data supplied from the camera controller 120 into the RAM 132. Moreover, the CPU 131 stores the image data into a memory card 191 by the memory card interface 190 as necessary or outputs the image data to a liquid crystal display panel 142 through the display controller 150.

The imaging apparatus 100 includes an operation key 141, the liquid crystal display panel 142, a speaker 143, and a microphone 144 as a user interface. The imaging apparatus 100 includes the display controller 150 as a controller of the liquid crystal display panel 142. When the moving image or the still image is displayed on the liquid crystal display panel 142 based on the image data stored in the RAM 132 and the memory card 191, a decoding processing is performed on the image data by the camera controller 120 and then the image data is outputted to the liquid crystal display panel 142 through the display controller 150.

The imaging apparatus 100 includes an audio codec 160 for performing encoding processing of an audio signal inputted from the microphone 144 and decoding processing of the audio signal when the audio is outputted to the speaker 143.

The imaging apparatus 100 includes the communication controller 170 for performing communication with other apparatuses. The communication controller 170 performs transmission/reception by an electric wave between the other apparatuses and the communication controller 170 through an antenna (not shown). In an audio communication mode, the communication controller 170 performs predetermined processing on the audio data which is received, and then outputs the audio data to the speaker 143 through the audio codec 160.

The imaging apparatus 100 includes an infrared communication unit 181 for performing infrared communication and an infrared interface 180 for connecting the infrared communication unit 181. Accordingly, the imaging apparatus 100 performs communication with other electronic apparatuses having an infrared communication function.

The imaging apparatus 100 includes the memory card interface 190 and has access to the memory card 191.

In the imaging apparatus 100, since the imaging lens 111 which is incorporated therein is configured so that the size reduction and the diameter increase can be archived while suppressing the total optical length as described above, it is particularly advantageous when the imaging apparatus 100 is incorporated into the electronic apparatus such as a mobile phone necessary for the size reduction.

It should be noted that the above-described embodiments are examples for embodying the present technology, and matters in the embodiments have a corresponding relationship with specific matters in the claims. Similarly, specific matters in the claims and matters in the embodiments of the present technology denoted by the same names have a corresponding relationship with each other. However, the present technology is not limited to the embodiments, and various modifications of the embodiments may be embodied in the scope of the present technology without departing from the gist of the present technology.

The present technology can be configured as follows.

(1) An imaging lens including: in order from an object side thereof, a first lens having a positive refractive power;

a second lens formed in a meniscus shape having a negative refractive power with a concave surface faced to an image side;

a third lens formed in a biconvex shape having a positive refractive power near an optical axis;

a fourth lens formed in a meniscus shape having a positive refractive power with a concave surface faced to the object side near the optical axis; and a fifth lens having a negative refractive power near the optical axis and a positive refractive power in a peripheral portion, the imaging lens satisfying the following conditional expression (a), $$3.0 \leq f3/f4 \leq 30.0 \tag{a}$$

where f3 is a focal length of the third lens, and f4 is a focal length of the fourth lens.

(2) The imaging lens according to Item (1), further satisfying the following conditional expressions (b), (c), (d), and (e):

$$vd1 > 50 \tag{b}$$

$$vd2 < 30 \tag{c}$$

$$vd3 > 50 \tag{d; and}$$

$$vd4 > 50 \tag{e}$$

where vd1 is an Abbe number of the first lens with respect to a d-line (wavelength 587.6 nm), vd2 is an Abbe number of the second lens with respect to a d-line (wavelength 587.6 nm), vd3 is an Abbe number of the third lens with respect to a d-line (wavelength 587.6 nm), and vd4 is an Abbe number of the fourth lens with respect to a d-line (wavelength 587.6 nm).

(3) The imaging lens according to Item (1) or (2), further satisfying the following conditional expression (f), $$0.4 < |f1/f2| < 1.2 \tag{f}$$

where f1 is a focal length of the first lens, and f2 is a focal length of the second lens.

(4) The imaging lens according to any one of Items (1) to (3), further satisfying the following conditional expressions (g) and (h):

$$0.2 < |f5/f| < 1.3 \tag{g; and}$$

$$vd5 > 50 \tag{h}$$

where f5 is a focal length of the fifth lens, f is a focal length of an entire lens system including the first lens, the second lens, the third lens, the fourth lens, and the fifth lens, and vd5 is an Abbe number of the fifth lens with respect to a d-line.

(5) The imaging lens according to any one of Items (1) to (4), in which the first lens, the second lens, the third lens, the fourth lens, and the fifth lens are constituted of resin-made lenses.

(6) The imaging lens according to any one of Items (1) to (5), further including a lens which has substantially no lens power.

(7) An imaging apparatus including:

an imaging lens including, in order from an object side thereof, a first lens having a positive refractive power, a second lens formed in a meniscus shape having a negative refractive power with a concave surface faced to an image side, a third lens formed in a biconvex shape having a positive refractive power near an optical axis, a fourth lens formed in a meniscus shape having a positive refractive power with a concave surface faced to the object side near the optical axis, and a fifth lens having a negative refractive power near the optical axis and a positive refractive power in a peripheral portion; and an imaging element configured to convert an optical image formed by the imaging lens into an electric signal, the imaging apparatus satisfying the following conditional expression (a), $$3.0 \leq f3/f4 \leq 30.0 \tag{a}$$

where f3 is a focal length of the third lens, and f4 is a focal length of the fourth lens.

(8) The imaging lens according to Item (7), further including a lens which has substantially no lens power.

The present disclosure contains subject matter related to that disclosed in Japanese Priority Patent Application JP 2011-252706 filed in the Japan Patent Office on Nov. 18, 2011, the entire content of which is hereby incorporated by reference.

What is claimed is:

1. An imaging lens comprising: in order from an object side thereof,
a first lens having a positive refractive power;
a second lens formed in a meniscus shape having a negative refractive power with a concave surface faced to an image side;
a third lens formed in a biconvex shape having a positive refractive power near an optical axis;
a fourth lens formed in a meniscus shape having a positive refractive power with a concave surface faced to the object side near the optical axis; and
a fifth lens having a negative refractive power near the optical axis and a positive refractive power in a peripheral portion, the imaging lens satisfying the following conditional expression (a), $$3.0 \le f3/f4 \le 30.0 \tag{a}$$

where
f3 is a focal length of the third lens, and
f4 is a focal length of the fourth lens.

2. The imaging lens according to claim 1, further satisfying the following conditional expressions (b), (c), (d), and (e):

$$vd1 > 50 \tag{b};$$

$$vd2 < 30 \tag{c};$$

$$vd3 > 50 \tag{d); and}$$

$$vd4 > 50 \tag{e}$$

where
vd1 is an Abbe number of the first lens with respect to a d-line (wavelength 587.6 nm),
vd2 is an Abbe number of the second lens with respect to a d-line (wavelength 587.6 nm),
vd3 is an Abbe number of the third lens with respect to a d-line (wavelength 587.6 nm), and
vd4 is an Abbe number of the fourth lens with respect to a d-line (wavelength 587.6 nm).

3. The imaging lens according to claim 1, further satisfying the following conditional expression (f), $$0.4 < |f1/f2| < 1.2 \tag{f}$$

where
f1 is a focal length of the first lens, and
f2 is a focal length of the second lens.

4. The imaging lens according to claim 1, further satisfying the following conditional expressions (g) and (h):

$$0.2 < |f5/f| < 1.3 \tag{g); and}$$

$$vd5 > 50 \tag{h}$$

where
f5 is a focal length of the fifth lens,
f is a focal length of an entire lens system including the first lens, the second lens, the third lens, the fourth lens, and the fifth lens, and
vd5 is an Abbe number of the fifth lens with respect to a d-line.

5. The imaging lens according to claim 1, wherein
the first lens, the second lens, the third lens, the fourth lens, and the fifth lens are constituted of resin-made lenses.

6. An imaging apparatus comprising:
an imaging lens including, in order from an object side thereof,
a first lens having a positive refractive power,
a second lens formed in a meniscus shape having a negative refractive power with a concave surface faced to an image side,
a third lens formed in a biconvex shape having a positive refractive power near an optical axis,
a fourth lens formed in a meniscus shape having a positive refractive power with a concave surface faced to the object side near the optical axis, and
a fifth lens having a negative refractive power near the optical axis and a positive refractive power in a peripheral portion; and
an imaging element configured to convert an optical image formed by the imaging lens into an electric signal, the imaging apparatus satisfying the following conditional expression (a), $$3.0 \le f3/f4 \le 30.0 \tag{a}$$

where
f3 is a focal length of the third lens, and
f4 is a focal length of the fourth lens.

7. The imaging apparatus according to claim 6, further satisfying the following conditional expressions (b), (c), (d), and (e):

$$vd1 > 50 \tag{b};$$

$$vd2 < 30 \tag{c};$$

$$vd3 > 50 \tag{d); and}$$

$$vd4 > 50 \tag{e}$$

where
vd1 is an Abbe number of the first lens with respect to a d-line (wavelength 587.6 nm),
vd2 is an Abbe number of the second lens with respect to a d-line (wavelength 587.6 nm),
vd3 is an Abbe number of the third lens with respect to a d-line (wavelength 587.6 nm), and
vd4 is an Abbe number of the fourth lens with respect to a d-line (wavelength 587.6 nm).

8. The imaging apparatus according to claim 6, further satisfying the following conditional expression (f), $$0.4 < |f1/f2| < 1.2 \tag{f}$$

where
f1 is a focal length of the first lens, and
f2 is a focal length of the second lens.

9. The imaging apparatus according to claim 6, further satisfying the following conditional expressions (g) and (h):

$$0.2 < |f5/f1| < 1.3 \tag{g); and}$$

$$vd5 > 50 \tag{h}$$

where
f5 is a focal length of the fifth lens,
f is a focal length of an entire lens system including the first lens, the second lens, the third lens, the fourth lens, and the fifth lens, and
vd5 is an Abbe number of the fifth lens with respect to a d-line.

10. The imaging apparatus according to claim 6, wherein
the first lens, the second lens, the third lens, the fourth lens, and the fifth lens are constituted of resin-made lenses.

* * * * *